United States Patent [19]

Westly et al.

[11] Patent Number: 4,915,526
[45] Date of Patent: Apr. 10, 1990

[54] STATIC-PROOF PLATEN FOR GRAPHICS PLOTTER

[75] Inventors: Pernie E. Westly, Huntington Beach; Alexander C. Grattan, Jr., La Habra; Susan Mathewes, Mission Viejo, all of Calif.

[73] Assignee: Calcomp Inc., Anaheim, Calif.

[21] Appl. No.: 175,946

[22] Filed: Mar. 31, 1988

[51] Int. Cl.$^4$ .............................................. B41J 13/10
[52] U.S. Cl. .................................... 400/642; 400/648
[58] Field of Search .................... 400/619, 690.4, 719, 400/578; 101/416

[56] References Cited

U.S. PATENT DOCUMENTS

| Re. 32,700 | 6/1988 | Westly et al. | 400/578 X |
|---|---|---|---|
| 2,445,271 | 7/1948 | Huebner | 101/416 R X |
| 2,473,751 | 6/1949 | Johnson | 101/416 R X |
| 4,340,319 | 7/1982 | Teichmann et al. | 400/690.4 |
| 4,515,491 | 5/1985 | Chevrel et al. | 400/490.4 X |
| 4,526,489 | 7/1985 | Tsumuraya et al. | 400/618 X |
| 4,641,982 | 2/1987 | Rekewitz | 400/690.4 X |
| 4,707,157 | 11/1987 | Hauslaib | 400/719 X |

Primary Examiner—Edgar S. Burr
Assistant Examiner—Ren Yan
Attorney, Agent, or Firm—Donald A. Streck; Wm. F. Porter, Jr.

[57] ABSTRACT

In a device having a driving mechanism for moving a writing medium over a platen disposed adjacent the mechanism and having a generally horizontal table portion and a curved outer portion where the writing medium is smoothly curved from a generally horizontal supported state to an unsupported vertically hanging state an improvement to the platen for eliminating static charge buildup problems. In its simplest form, it comprises a plurality of horizontal grooves in the upper surface of at least the curved outer portion of the platen at spaced intervals. Preferably, the plurality of horizontal grooves are substantially V-shaped in cross-section so as to create, in effect, a series of overlapped plates on the surface of the platen which, in turn, cause the creation of areas of air turbulence which partially support the moving medium. In the totally preferred embodiment, the surface of the platen is covered with a uniform layer of a static charge conducting material and then the surface of the platen is splattered with additional static charge conducting material of a sufficiently viscous consistency so as to create a series of slightly raised conductive bumps on the surface of the platen on which a writing medium can be supported and which aid in the formation of the areas of air turbulence.

3 Claims, 3 Drawing Sheets

STATIC-PROOF PLATEN FOR GRAPHICS PLOTTER

BACKGROUND OF THE INVENTION

The present invention relates to graphics plotters and, more particularly, in a graphics plotter having a driving roller mechanism for moving a writing medium over a platen disposed adjacent the roller mechanism and having a generally horizontal table portion and a curved outer portion where the writing medium is smoothly curved from a generally horizontal supported state to an unsupported vertically hanging state, to the method of improving the platen to eliminate static charge buildup problems comprising horizontally grooving the upper surface of at least the curved outer portion of the platen at spaced intervals to create a plurality of horizontal grooves of substantially V-shaped cross-section so as to create, in effect, a series of overlapped plates on the surface of the platen, covering the surface of the platen with a uniform layer of a static charge conducting material, and splattering the surface of the platen with additional static charge conducting material of a sufficiently viscous consistency so as to create a series of slightly raised conductive bumps on the surface of the platen on which a writing medium can be supported and over which it can ride.

Graphics plotters constructed with a drive system as shown in simplified form in FIG. 1 have become very popular because of their ability to handle large sheets of paper or other writing mediums in a small floor space. As shown in end view in FIGS. 1-3, there is a driving roller 10 over which the writing medium 12 is moved by being pinched between the driving roller 10 and a plurality of pinch rollers 14 as the driving roller 10 is reversably driven in one direction and then the other. To support the writing medium 12 for smooth movement back and forth and to provide a supported surface for drawing upon the writing medium 12 as it is moved, there are a pair of platens 16 disposed with one on each side of the rollers 10, 14. The platens 16 each have a generally horizontal table portion 18 and a curved outer portion 20 where the writing medium is smoothly curved from a generally horizontal supported state to an unsupported vertically hanging state.

With slow plotting speeds, the foregoing prior art configuration was suitable for its purpose; that is, the writing medium 12 moved back and forth without problem.. With the introduction of faster and faster plotting speeds, however, physical distortion of the writing medium such as that depicted in FIG. 3 began to create serious problems. As depicted in FIG. 2, as the writing medium 12 is pulled over a platen 16 from the vertical to the horizontal, there is no problem. Such is not the case on the other side of the rollers 10, 14, however, where the writing medium 12 is being pushed from its horizontal state on the table portion 18 over the curved outer portion 20 as depicted in FIG. 3. The static charges built up on the writing medium 12 (particularly with thin vellums, and the like) as a result of the dragging motion across the platens 16 cause it to cling and stick to the surface of the platen 16 which, in turn, causes it to bunch up and move erratically, causing associated problems. Coating the surface of the platens 16 with a static charge conductive material as is known in the art provides some relief; but, not complete relief.

Wherefore, it is the object of the present invention to provide a platen for use in such pinch roller driven graphics plotters, and the like, wherein static charge clinging of the writing medium is virtually eliminated.

Other objects and benefits of the present invention will become apparent from the description which follows hereinafter when taken in conjunction with the drawings which accompany it.

SUMMARY

The foregoing objects have been achieved in a device having a driving mechanism for moving a writing medium over a platen disposed adjacent the mechanism and having a generally horizontal table portion and a curved outer portion where the writing medium is smoothly curved from a generally horizontal supported state to an unsupported vertically hanging state by the improvement to the platen for eliminating static charge buildup problems of the present invention comprising a plurality of horizontal grooves in the upper surface of at least the curved outer portion of the platen at spaced intervals.

In the preferred embodiment, the plurality of horizontal grooves are substantially V-shaped in cross-section so as to create, in effect, a series of overlapped plates on the surface of the platen which, in combination with the writing medium moving over them, create areas of air turbulence which support the writing medium from making intimate contact with the surface of the platen.

Further in the preferred embodiment, the surface of the platen is covered with a uniform layer of a static charge conducting material and the surface of the platen is splattered with additional quantity of the static charge conducting material of a sufficiently viscous consistency so as to create a series of slightly raised conductive bumps on the surface of the platen on which a writing medium can be supported and over which it can ride and which, in combination with the grooves, aid in the creation of the air turbulence.

DESCRIPTION OF THE PREFERRED EMBODIMENT

As depicted in FIGS. 4-7, the foregoing objects have been achieved in the platen 16' of the present invention by retaining the basic shape of the prior art platens (as described hereinabove) and modifying it in two ways. First, the curved outer portion 20', in particular, is horizontally grooved at spaced intervals to create, in effect, a series of overlapped plates 22. Second, after a uniform layer of static charge conducting material 24 is deposited on the platen 16', additional static charge conducting material 24 of a sufficiently viscous consistency is splattered over the upper surfaces 26 of the table portion 18' and the curved outer portion 20' to create a series of slightly raised conductive bumps 30 over which the writing medium rides. As a result of this minimum contact environment, very little static charge is created and any such charge which is created is easily conducted away by the conducting material 24.

Figure 2:
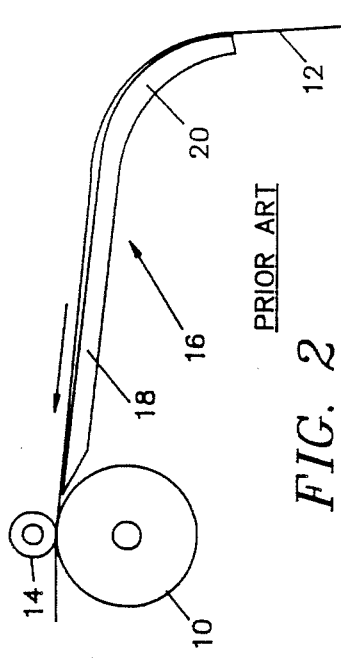
FIG. 2 is an enlarged view of one platen and the pinch roller drive mechanism of FIG. 1 showing movement of the drawing medium thereover in one direction.
Figure 4:
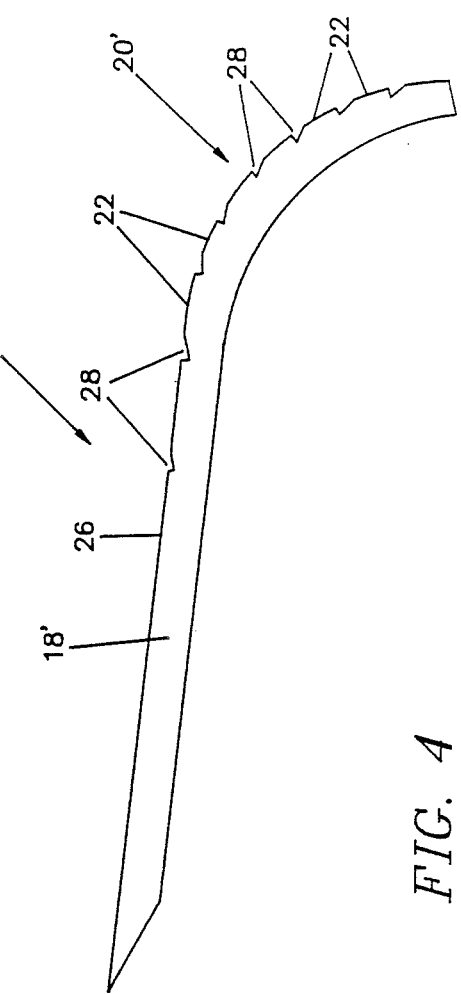
FIG. 4 is an enlarged, simplified end view of a platen according to the present invention.
Figure 1:
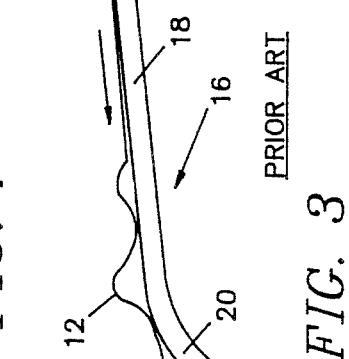
FIG. 1 is a simplified end view drawing of the pinch roller drive mechanism and associated platens over which the drawing medium moves in a prior art graphics plotter.
Figure 3:
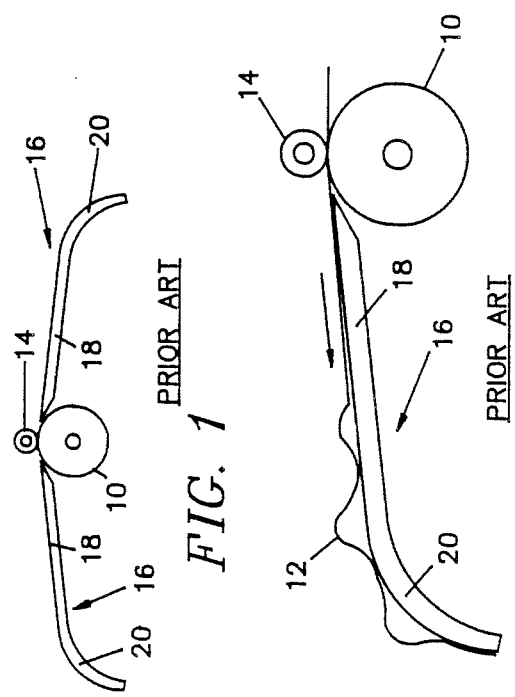
FIG. 3 is an enlarged view of the other platen and the pinch roller drive mechanism of FIG. 1 showing movement of the drawing medium thereover in the opposite direction and the resultant buckling of the drawing medium as a result of static charges and sticking caused by the prior art platen.
Figure 5:
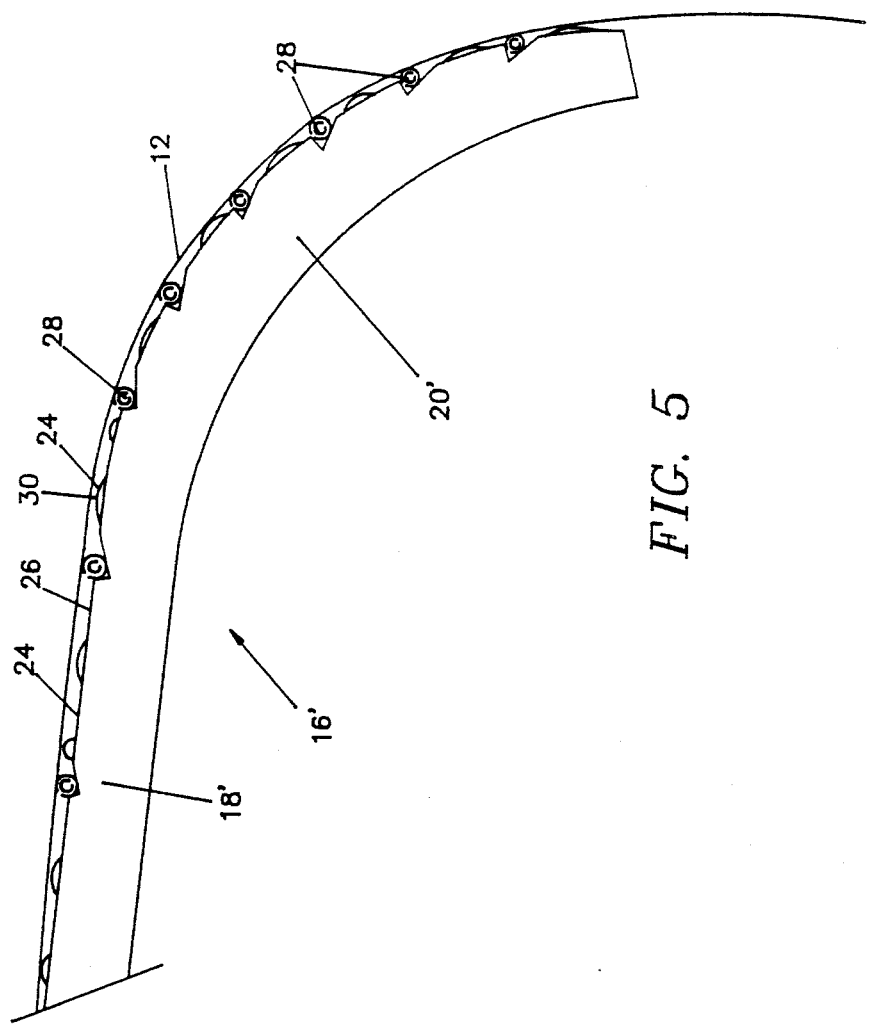
FIG. 5 is a more enlarged, simplified end view of the most curved outer portion of a platen according to the present invention showing the splatters of conductive coating on the surface thereof and the manner in which the drawing medium moves thereover creating air turbulence to aid in supporting the medium.
Figure 6:
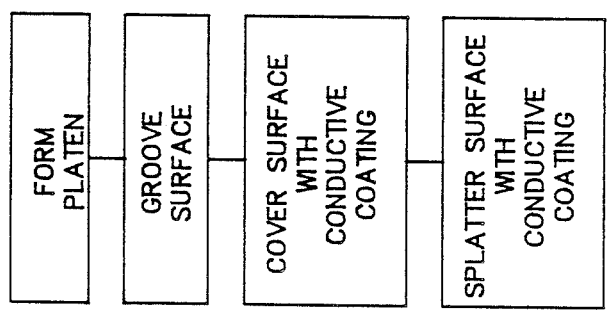
FIG. 6 is a block diagram of the steps in the method of forming a static-proof platen according to the present invention.
Figure 7:
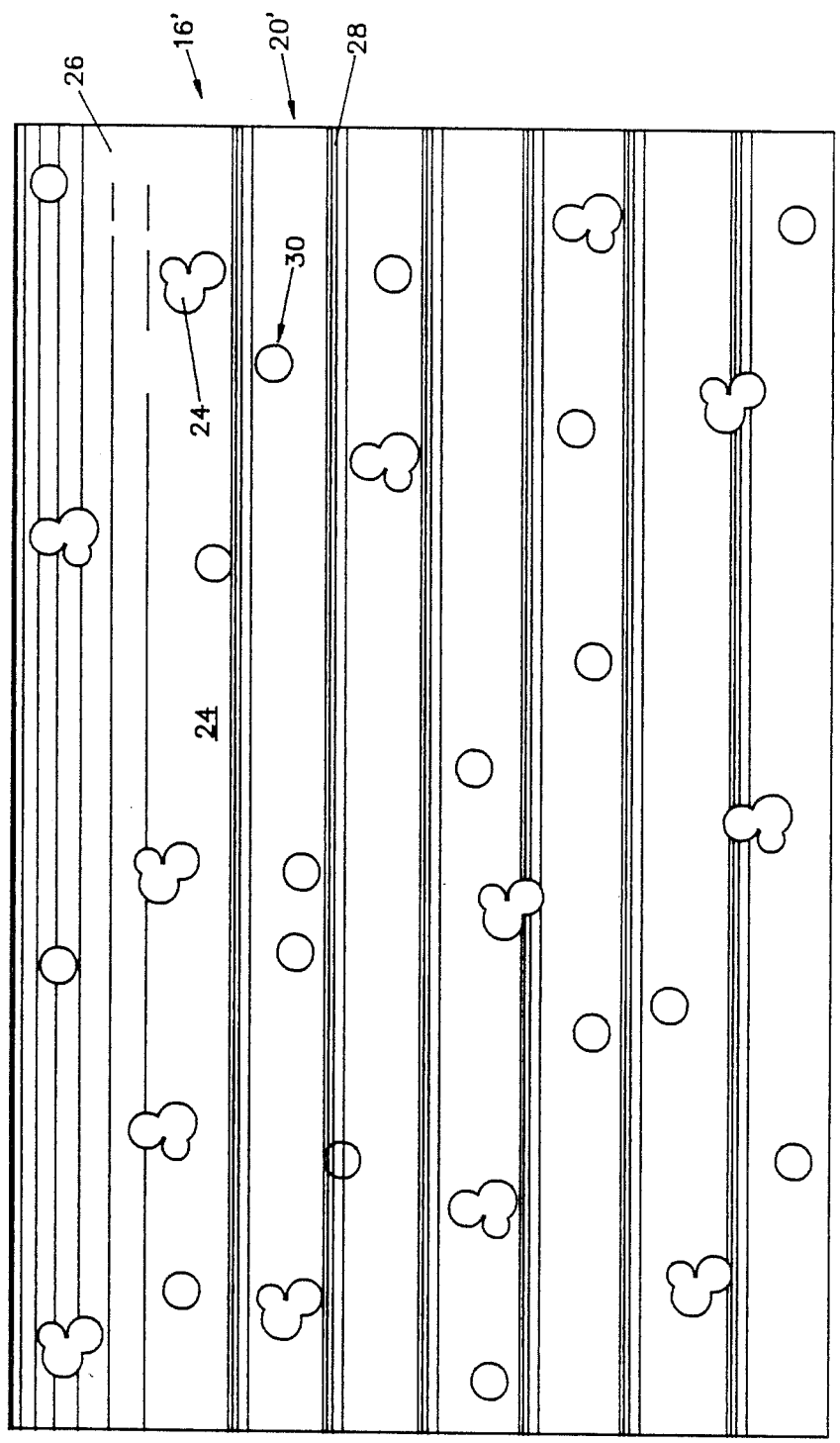
FIG. 7 is an enlarged, simplified side elevation view of a platen according to the present invention.

As can be seen in the enlarged side view of FIG. 5, the upper surface 26 has horizontal generally V-shaped grooves 28 cut therein. In the preferred embodiment, the grooves 28 are shaped in cross-section such as to create, in effect, a series of overlapped plates 22. This makes the upper surface smooth but discontinuous. As also best seen from the enlarged side view of FIG. 5, the splattered static charge conducting material 24 creates a series of irregularly sized and shaped bumps 30 on the surface 26 on which the writing medium 12 is periodically partially supported and over which the writing medium 12 actually rides as is is moved back and forth. The grooves 28 and bumps 30, in combination, form areas of air turbulence between the top of the platen 16' and the writing medium 12 as noted in FIG. 5. These areas of air turbulence prevent the writing medium 12 from making intimate contact with the surface of the platen 16'. This prevents the formation of unwanted static charges. When there is contact, it is via the raised bumps 30 of the conductive material 24 such that there is little area of moving contact for the creation of static charges and any static charges that may actually be created are conducted away by the material 24. As can be appreciated, therefore, what has been created by the present invention is an environment which is simply not conducive to the formation of static charges.

Wherefore, having thus described the present invention, what is claimed is:

1. In a graphics plotter having a driving roller mechanism for moving a writing medium in a first direction over a platen disposed transverse to the first direction adjacent the roller mechanism and having a generally horizontal table portion and a curved outer portion where the writing medium is smoothly curved from a generally horizontal supported state to an unsupported vertically hanging state the method of improving the platen to eliminate static charge buildup problems comprising the steps of:
    (a) transversely grooving the upper surface of at least the curved outer portion of the platen in a second direction transverse to the first direction by creating a plurality of grooves of substantially V-shaped cross-section so as to create, in effect, a series of plates on the surface of the platen overlapped in the first direction
    (b) covering the surface of the platen with a uniform layer of a static charge conducting material; and,
    (c) splattering the surface of the platen with additional static charge conducting material of a sufficiently viscous consistency so as to create a series of slightly raised conductive bumps on the surface of the platen on which a writing medium can be supported and over which it can ride.

2. The method of improving a platen for a graphics plotter of claim 1 wherein said steps include:
    creating said grooves of a cross-section which will create areas of air turbulence on the surface of the platen in said grooves as a result of the writing medium moving thereacross to partially support the writing medium.

3. In a device having a driving mechanism for moving a writing medium in a first direction over a platen disposed transverse to the first direction adjacent the mechanism and having a generally horizontal table portion and a curved outer portion where the writing medium is smoothly curved from a generally horizontal supported state to an unsupported vertically hanging state the improvement to the platen for eliminating static charge buildup problems comprising:
    (a) a plurality of grooves transverse to the first direction in the upper surface of at least the curved outer portion of the platen at spaced intervals said grooves being substantially V-shaped in cross-section so as to create, in effect, a series of plates transverse to the first direction on the surface of the platen and to create areas of air turbulence on the surface of the platen as a result of the writing medium moving thereacross to support the writing medium;
    (b) the surface of the platen being covered with a uniform layer of static charge conducting material; and,
    (c) said uniform layer of a static charge conducting material being splattered with an additional quantity of the static charge conducting material of a sufficiently viscous consistency so as to create a series of slightly raised conductive bumps on the surface of the platen on which the writing medium can be supported and over which it can ride.

* * * * *